(12) United States Patent
Beeman et al.

(10) Patent No.: US 10,059,174 B1
(45) Date of Patent: Aug. 28, 2018

(54) APPARATUS FOR ADJUSTING A WINDSHIELD ON A MOTOR VEHICLE

(71) Applicant: J.D. FAMILY ENTERPRISES, INC., Brentwood, CA (US)

(72) Inventors: Justin Beeman, Livermore, CA (US); Dave Hall, Brentwood, CA (US)

(73) Assignee: J.D. FAMILY ENTERPRISES, INC., Brentwood, CA (US)

( * ) Notice: Subject to any disclaimer, the term of this patent is extended or adjusted under 35 U.S.C. 154(b) by 0 days.

(21) Appl. No.: 15/442,033

(22) Filed: Feb. 24, 2017

(51) Int. Cl.
*B60J 1/04* (2006.01)
*B62J 17/04* (2006.01)

(52) U.S. Cl.
CPC ................ *B60J 1/04* (2013.01); *B62J 17/04* (2013.01)

(58) Field of Classification Search
CPC ... B62J 17/04; B62J 17/02; B62J 17/00; B62J 17/06; B62J 99/00; B62J 23/00; B62J 15/00; B62J 2099/0086
USPC .... 296/78.1, 91, 92, 84.1, 75, 29, 1.08, 208; 180/219, 68.3, 229, 68.1
See application file for complete search history.

(56) References Cited

U.S. PATENT DOCUMENTS

| 4,130,315 A * | 12/1978 | Shields | B62J 17/02 280/288.2 |
| 5,997,070 A * | 12/1999 | Matsuo | B62J 17/04 180/903 |
| 8,177,250 B2 * | 5/2012 | Fukuyama | B62J 17/00 180/229 |
| 8,424,949 B2 * | 4/2013 | Ransone | B62J 17/02 280/288.2 |
| 8,651,551 B2 * | 2/2014 | Fukuda | B62J 17/04 280/124.1 |
| 8,910,993 B2 * | 12/2014 | Iida | B62J 17/02 296/78.1 |

\* cited by examiner

*Primary Examiner* — D Glenn Dayoan
*Assistant Examiner* — Sunsurraye Westbrook
(74) *Attorney, Agent, or Firm* — Nicholson De Vos Webster & Elliott LLP

(57) ABSTRACT

An apparatus for adjusting a windshield of a motor vehicle. For example, one embodiment of the apparatus comprises: a position adjustment plate coupled to or formed in a frame, the position adjustment plate having a plurality of holes; an adjustment knob rotatably coupled to the frame and having a pin to engage with the holes on the position adjustment plate; and an adjustment rod fixedly coupled to the adjustment knob and further coupled to one or more linkages, at least one of the one or more linkages coupled to the windshield of the motor vehicle, wherein the rotational motion of the adjustment knob rotates the adjustment rod to translate a force through the one or more linkages to cause the windshield to be moved in a substantially forward or backward direction relative to a driver.

3 Claims, 7 Drawing Sheets

APPARATUS FOR ADJUSTING A WINDSHIELD ON A MOTOR VEHICLE

BACKGROUND

Field of the Invention

This invention relates generally to the motor vehicles. More particularly, the invention relates to an apparatus for adjusting the windshield on a motor vehicle such as a motorcycle.

Description of the Related Art

FIG. 1 illustrates a current apparatus for adjusting a motorcycle windshield 100 which includes a gearbox 110 fixedly coupled via bolts 115 to a front end 105 of the motorcycle. In the current implementation, the driver turns an adjustment knob 125 which applies a torsional force on a rod 130 connected to gears within the gearbox 110. As the rod 130 rotates in response to movement of the adjustment knob 125, the gearbox 110 translates the rotation to a second rod 135 perpendicular to the first rod 130.

Two linkage elements 141 are coupled to each end of the second rod 135 (only one being visible in FIG. 1) at pivot points 146 offset from the surface of the rod 135, such that when the second rod 135 rotates, a force is translated through linkage element 141 in a direction corresponding to the direction of rotation. Linkage element 141 is coupled to a second linkage element 145 at a pivot point 140 using a bolt which moves along a guide slot 142 in response to the force. The second linkage element 145 is pivotally coupled to the windshield 100, causing the windshield 100 to move forward or backward (relative to the driver) in response to the motion of linkage element 145 through the guide slot 142.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Figure 2:
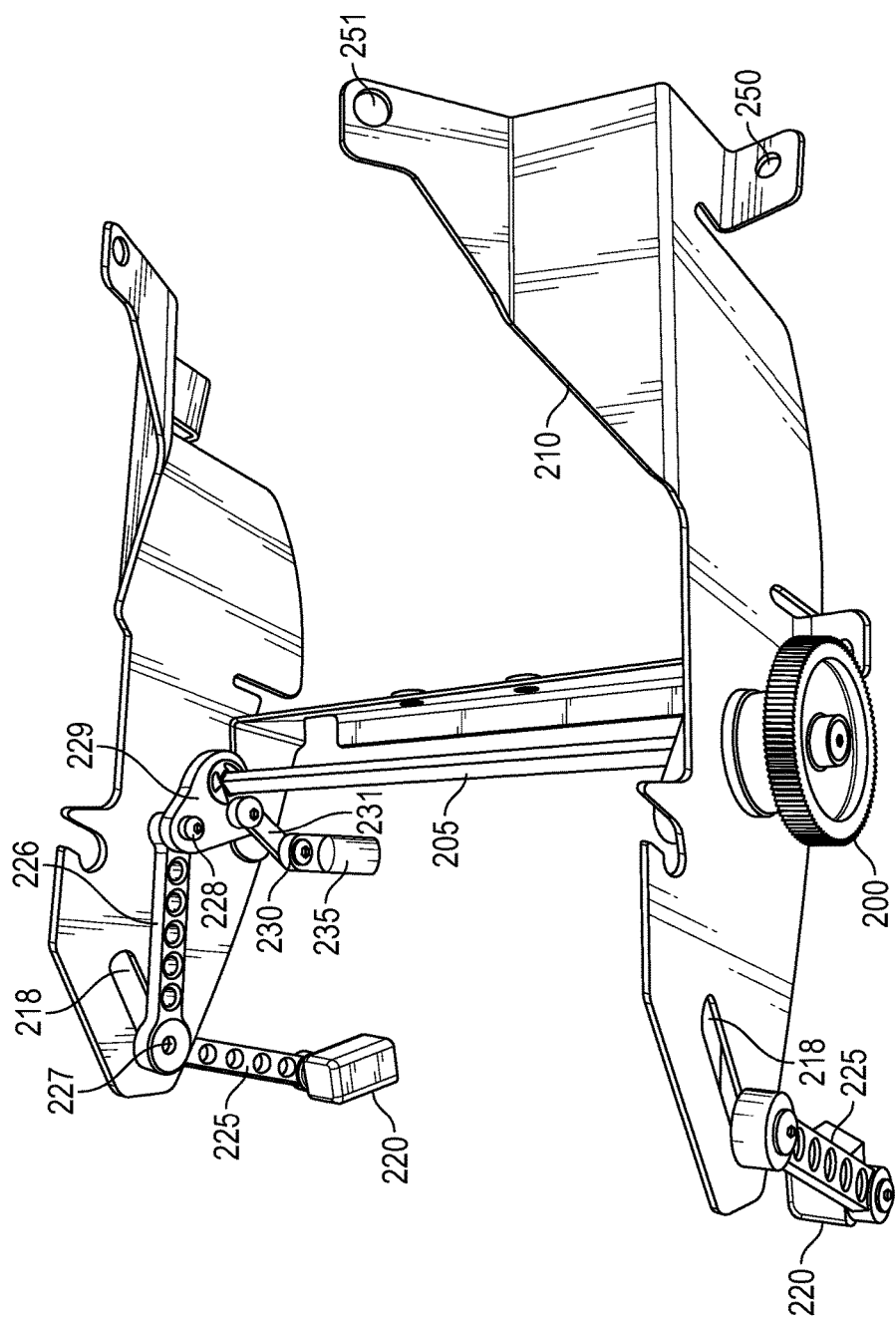
FIG. 2 illustrates one embodiment of an apparatus for adjusting a windshield.

One embodiment of the invention comprises a new apparatus for adjusting a windshield on a motorcycle (or other form of motor vehicle) which provides significant benefits over current implementations. FIG. 2 illustrates one embodiment of the apparatus comprising a rod 205 fixedly coupled to an adjustment knob 200 and rotatably coupled to a metal frame 210. In one embodiment, the metal frame 210 includes holes (such as 251, 252) positioned to line up with screw holes formed in the front end of the motorcycle (not shown in FIG. 2), to allow the metal frame 210 to be fixedly coupled to the front end.

Figure 4:
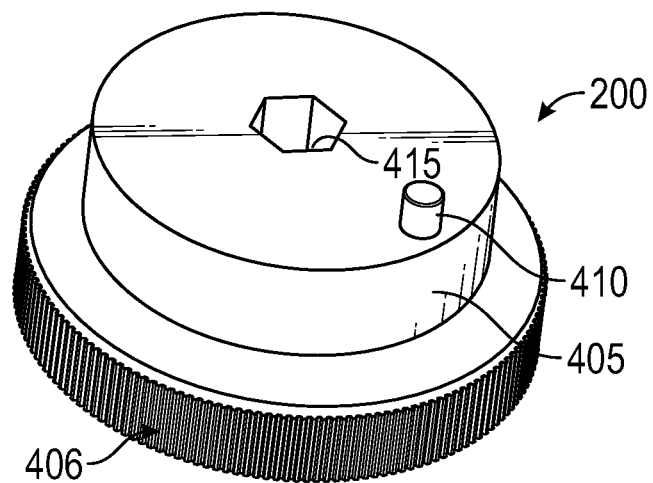
FIG. 4 illustrates an inner edge of an exemplary control knob.
Figure 7:
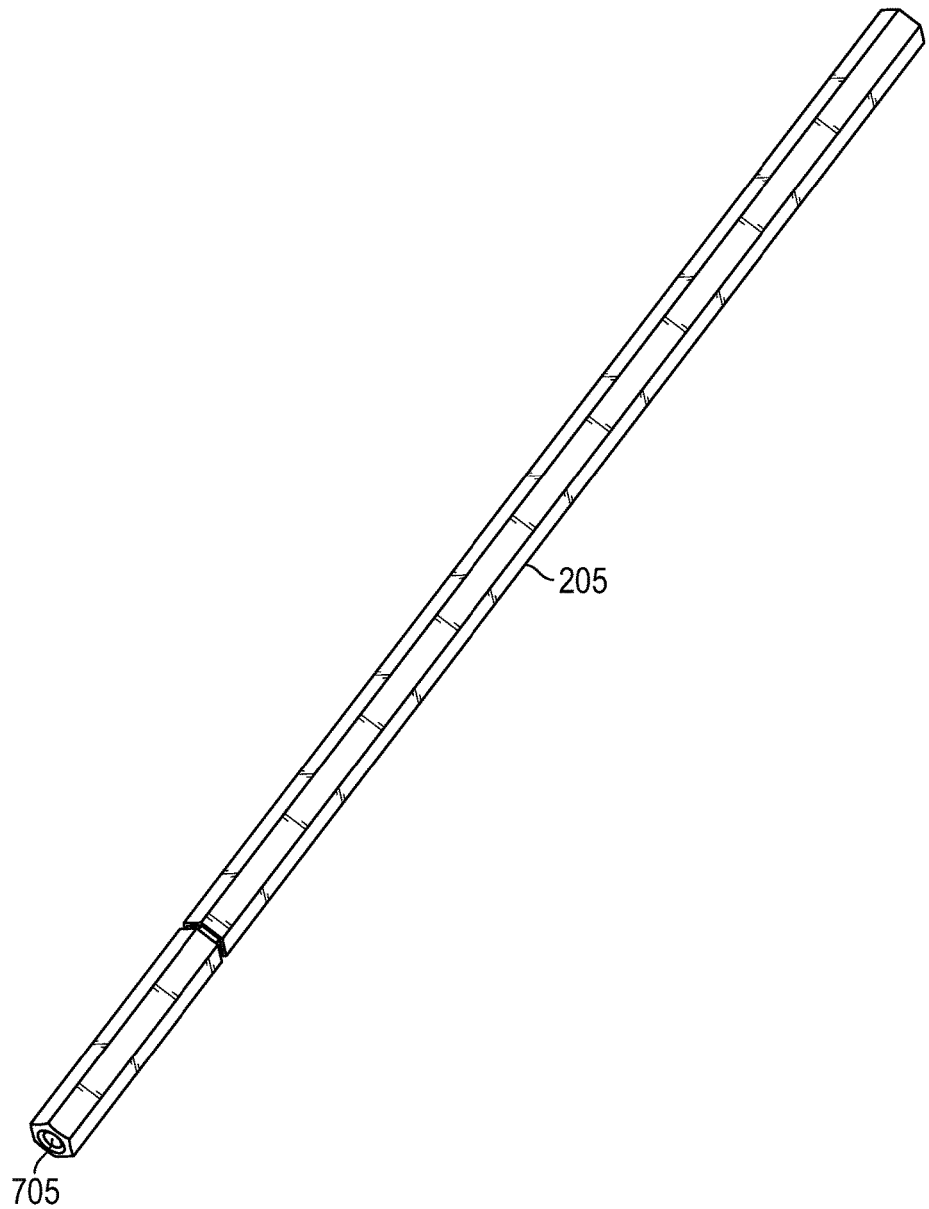
FIG. 7 illustrates one embodiment of the hexagonal rod.

In one implementation, the rod 205 has a hexagonal shape as illustrated in FIG. 7 and has threads 705 at each end to engage with the threads of screws to secure the rod to the adjustment knob 200 on one end and to the metal frame 210 on the other end. As illustrated in FIG. 4, in one embodiment, the adjustment knob 200 includes a hexagonal hole 415 sized to fit the hexagonal rod 205. For example, the width of the hexagonal rod 205 may be the same size or marginally smaller than the size of the hole 415, so that it will engage with the sides of the hole 415 and translate a torsional force through the rod 205 when the driver rotates the adjustment knob 200. FIG. 4 also illustrates that the adjustment knob 200 may include two different cylindrical circumferences—a larger circumference with a ribbed (or otherwise non-smooth) surface 406 to increase friction when engaged with driver's hand (e.g., skin or glove) and a smaller circumference 405 with a smooth surface which extends the surface area over which the hexagonal rod 415 engages with the hexagonal hole 415.

Figure 3:
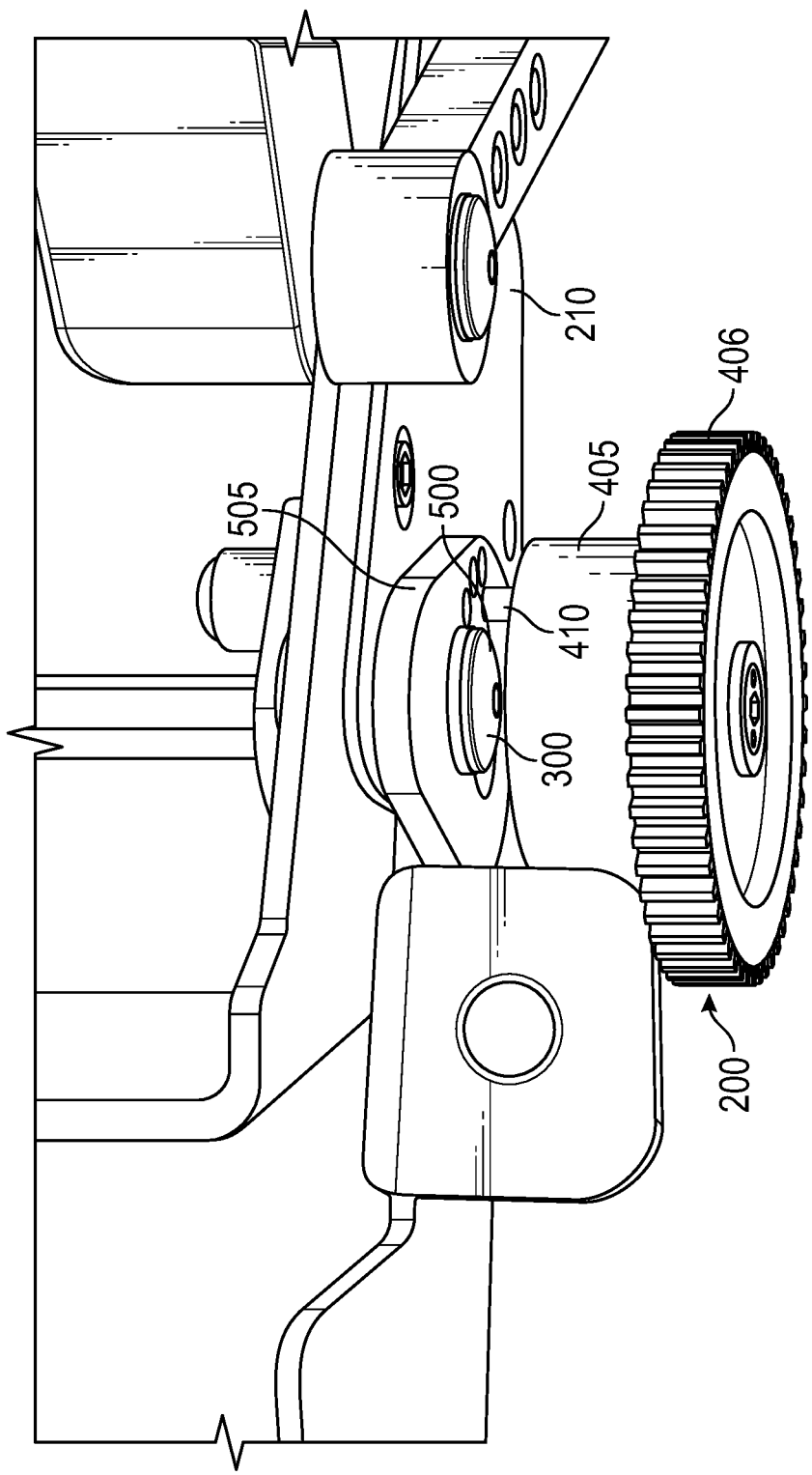
FIG. 3 illustrates an exemplary control knob with a pin arranged to engage with holes in a position adjustment plate.
Figure 5:
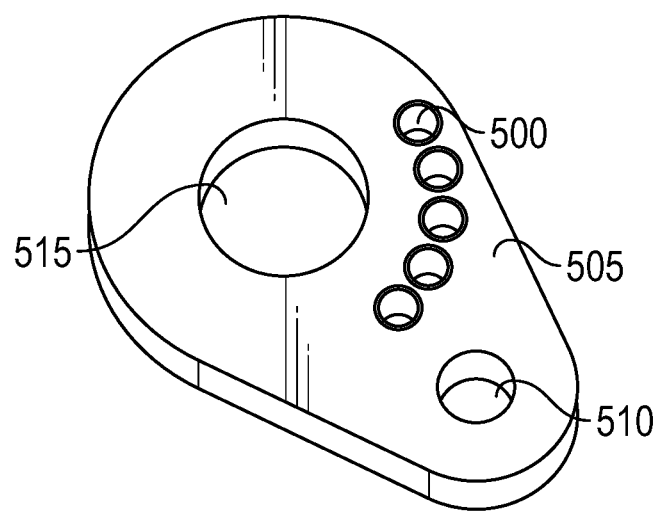
FIG. 5 illustrates an exemplary position adjustment plate.
Figure 6:
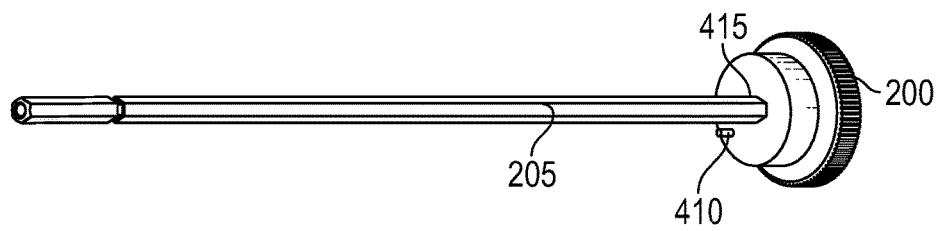
FIG. 6 illustrates one embodiment of a hexagonal rod engaged with an adjustment knob.

In addition, the adjustment knob 200 includes an adjustment pin 410 to engage with a series of holes 500 in a position adjustment plate 505 illustrated in FIG. 5. Another hole 510 in the position adjustment plate 505 is used to secure the position adjustment plate 505 to the metal frame 210 (e.g., via bolts/nuts or other attachment mechanisms). A larger hole 515 provides space for the hexagonal rod 205 to pass through to interconnect with the adjustment knob 406. As illustrated in FIG. 3, in one embodiment, the position adjustment plate 505 is secured to the metal frame via a bolt 310 to secure the position adjustment plate between the adjustment knob 200 and the metal frame 210. In the example shown in FIG. 3, the adjustment knob has been pulled out and the pin 410 is thus disengaged with a hole 500 on the position adjustment plate 505. In this disengaged position, the driver may rotate the adjustment knob 200 and insert the adjustment pin 410 into a different hole 500, thereby rotating the hexagonal shaft 205 to adjust the windshield (as described in greater detail below).

Figure 8:
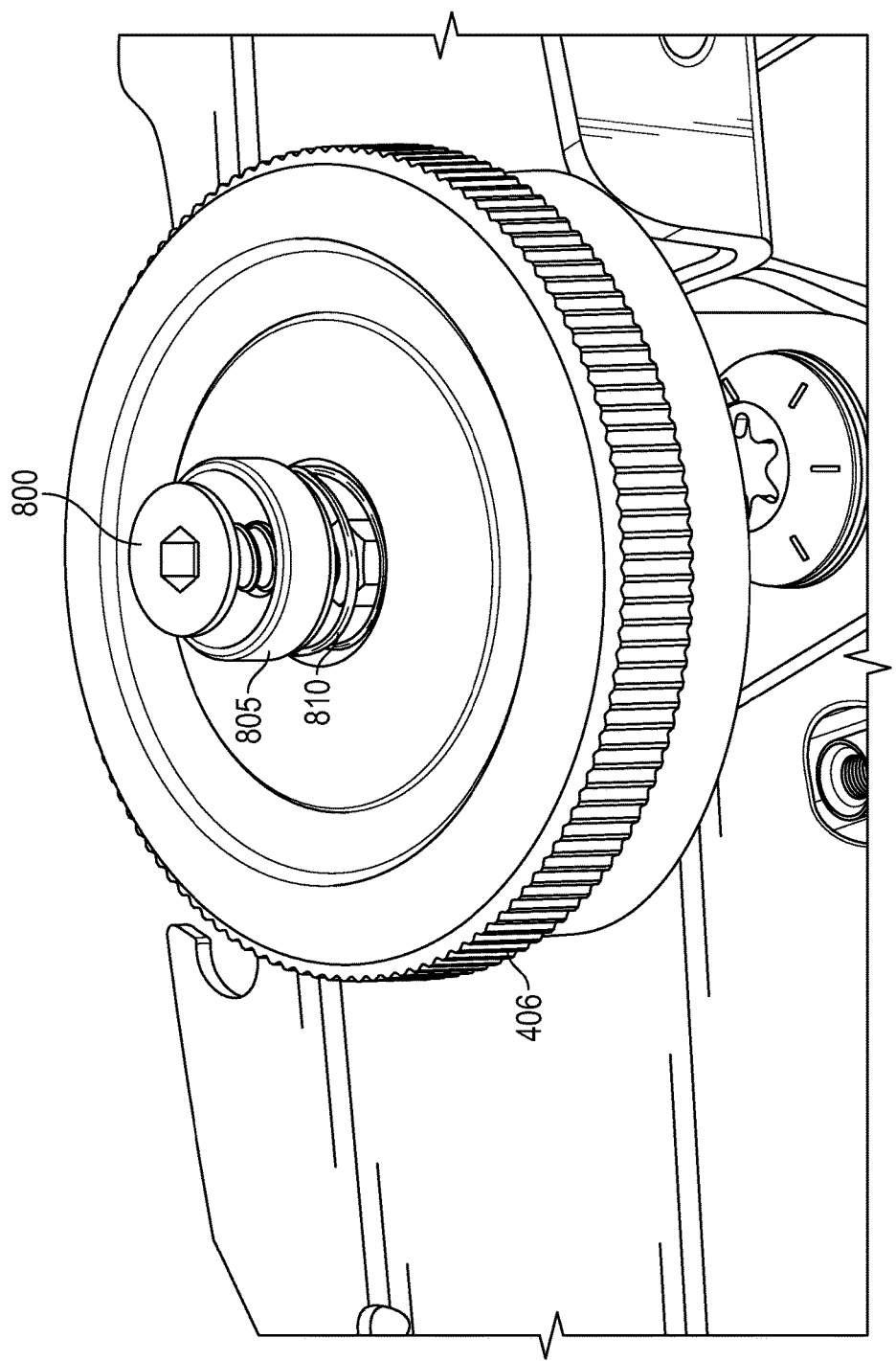
FIG. 8 illustrates a spring mechanism used for one embodiment of the adjustment knob.
Figure 9:
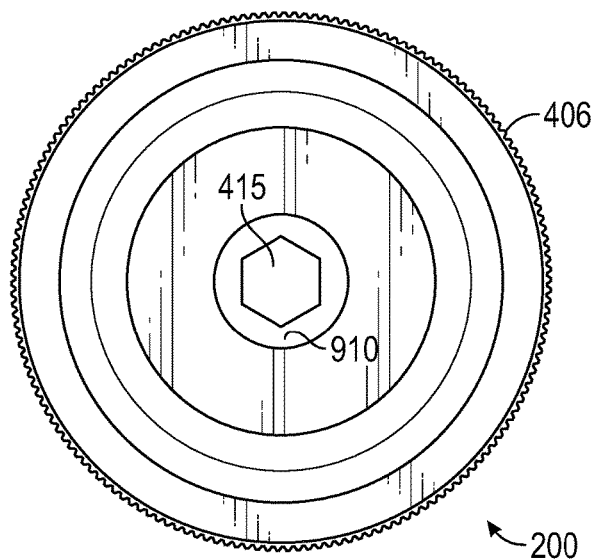
FIG. 9 illustrates an exemplary front side of the adjustment knob.

In one embodiment, when the driver has finished adjusting the position of the control knob 200, a spring is configured to pull the control knob 200 back towards the position adjustment plate 505. FIGS. 8-9 illustrates one implementation in which a spring 810 is positioned between a spring retainer 805 and an inner, recessed surface 910 of the control knob 200. The spring retainer 805 is secured to the hexagonal rod 705 via a hex bolt 800. When in place, the driver may pull out on the control knob 200, thereby compressing the spring and disengaging the pin 410 over a different hole 500. When the driver then releases the control knob 200, the spring 810 forces the control knob 200 towards the position adjustment plate 505, engaging the pin 410 with the new hole 500.

Figure 10:
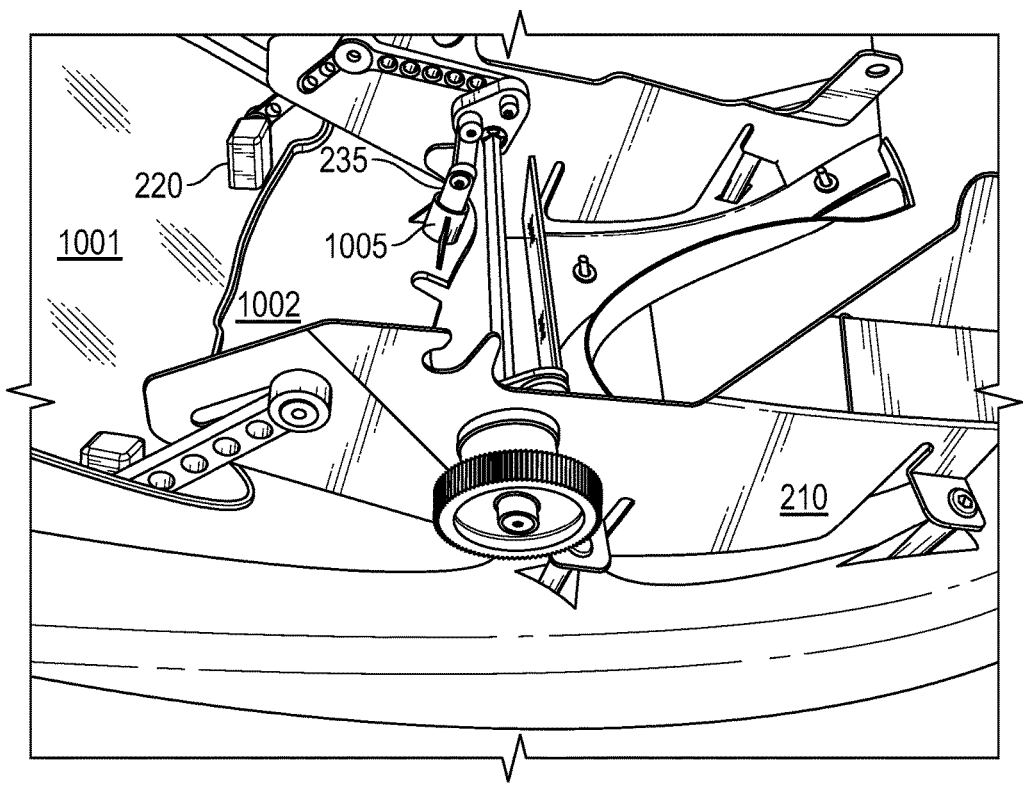
FIG. 10 illustrates one embodiment of an apparatus connected to a front end and windshield of a motorcycle.

The movement of a windshield will now be described with respect to FIG. 2 (which shows the apparatus detached from the windshield) and FIG. 10 (which shows the apparatus attached to a windshield). The hexagonal rod 205 is engaged with two rotation plates 229 (only one of which is shown in FIG. 2 because of the perspective) positioned towards opposing ends of the hexagonal rod 205 but on the inner side of the metal frame 210. The rotation plates 229 include a hexagonal hole to engage with the hexagonal outer surface of the rod 205 and sized similarly to the hole 415 on the control knob 200. A first linkage element 231 and second linkage element 226 are rotatably coupled to each rotation plate 229 at different rotation points, as illustrated. Bolts 228 and nuts (not shown) may be used to form the connection, although the underlying principles of the invention are not limited to any particular type of connection. Linkage element 231 is rotatably coupled to a front end connection element 235 at rotation point 320. FIG. 10 illustrates the connection element fixedly engaged with a hole 1005 on the front end 1002 of the motorcycle.

In addition, linkage element 226 is rotatably coupled to a second linkage element 225 via rotation point 227 (which, again, may be accomplished via a bolt or similar connection mechanism) using a bolt which moves along a guide slot 218 in response to a force applied to linkage 226 via the rotation plate 229. The second linkage element 225 is pivotally coupled to connection element 220 which secures the second linkage element 225 to the windshield 1001, causing the windshield 100 to move forward or backward (relative to the driver) in response to the motion of linkage elements 225, 226 through the guide slot 218.

Thus, in operation, when the user pulls out the adjustment knob 200, compressing the spring 810 and disengaging the pin 410 from the position adjustment plate and rotates the adjustment knob in a counter-clockwise direction (relative to the orientation shown in FIGS. 2 and 10), the rotation plate 229 will also rotate in a counter-clockwise manner along with the hexagonal rod 205. The connection point 227 engaged with the guide slot 218 will be pushed to the left (again, relative to the orientation shown in FIGS. 2 and 10), thereby moving the windshield 1001 away from the driver. Conversely, when the user pulls out the adjustment knob 200, compressing the spring 810 and disengaging the pin 410 from the position adjustment plate and rotates the adjustment knob in a clockwise direction (relative to the orientation shown in FIGS. 2 and 10), the rotation plate 229 will also rotate in a clockwise manner along with the hexagonal rod 205. The connection point 227 engaged with the guide slot 218 with move to the right (again, relative to the orientation shown in FIGS. 2 and 10), thereby moving the windshield 1001 towards the driver. When the driver finishes making an adjustment, he/she releases the adjustment knob 200 which is pulled towards the adjustment plate 505, thereby engaging the pin 415 with a new hole 500 and securing the windshield 1001 in plate.

In one embodiment, the adjustment knob 200 is formed from a high strength plastic material and the other components of the apparatus (e.g., rod 205, rotation plate 229, linkages 226, 225, etc, are formed from metal such as steel or aluminum or high strength plastic. However, any type of material may be used while still complying with the underlying principles of the invention.

In one implementation, the various components have the following approximate sizes. However, the underlying principles of the invention are not limited to any particular size for these components.

Figure 1:
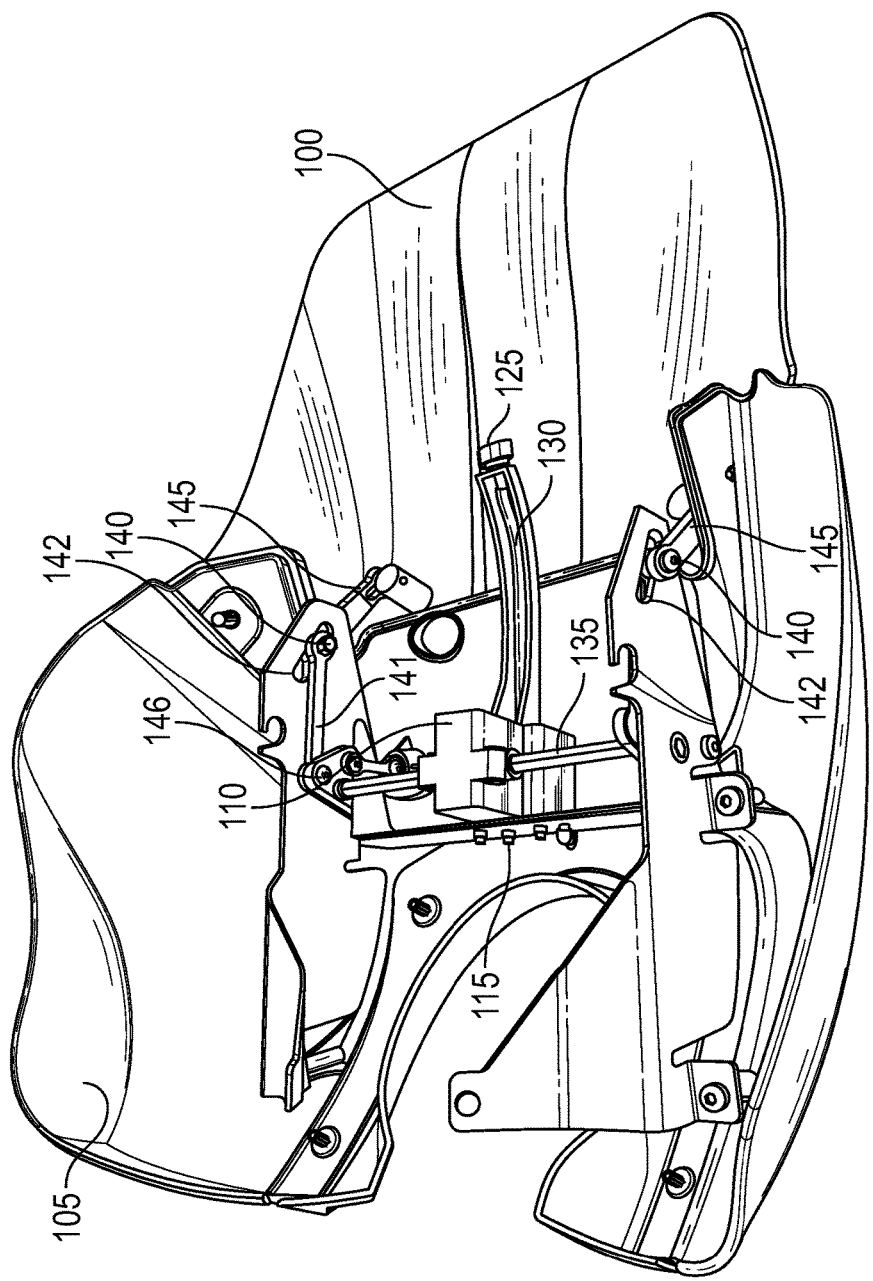
FIG. 1 illustrates a prior art apparatus for adjusting a motorcycle windshield.

A. Adjustment Knob 200:
   Large circumference, 1.990 in
   Small circumference, 1.4 in
   Length, 0.75 in
   Hex hole size, 0.315 in
B. Hexagonal Rod 205:
   Length, 10. in
   Width, 0.310 in The apparatus for adjusting a windshield are superior to the prior mechanism illustrated in FIG. 1 in several ways. First, the position of the adjustment knob 125 in the existing mechanism requires the driver to move his hand a significant distance from the handlebars of the motorcycle to perform the adjustment. In contrast, the adjustment knob 200 described herein is located in close proximity to the driver's left hand, making it safer to adjust the windshield when driving (i.e., because the user may keep his right hand, which is typically the dominant hand, in control of the motorcycle and only move the left hand a few inches from the handlebars). In addition, the apparatus described herein does not require a relatively complex and costly gearbox 110 to translate torsional forces between the two different orientations. Rather, in the implementation described herein, the force is applied directly to the hexagonal rod 205 via the adjustment knob 200 and does not require a costly gearbox. Thus, the windshield adjustment apparatus described herein is both easier to use and cheaper to manufacture than the current gearbox mechanism.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. An apparatus for adjusting a windshield of a motor vehicle comprising:
   a position adjustment plate coupled to or formed in a frame, the position adjustment plate having a plurality of holes disposed in an arc about an axis;
   an adjustment knob rotatably coupled to the frame and having a pin to engage with the plurality of holes on the position adjustment plate; and
   an adjustment rod fixedly coupled to the adjustment knob and further coupled to one or more linkages, at least one of the one or more linkages coupled to the windshield of the motor vehicle, the adjustment rod substantially collinear with the axis,
   wherein the rotational motion of the adjustment knob rotates the adjustment rod to translate a force through the one or more linkages to cause the windshield to be moved in a substantially forward or backward direction relative to a driver.

2. The apparatus as in claim 1 further comprising:
   a spring coupled to apply force on the adjustment knob in a direction of the position adjustment plate.

3. The apparatus as in claim 2 further comprising:
a spring retainer coupled to an end of the adjustment rod, the spring configured between the spring retainer and a surface of the adjustment knob.

\* \* \* \* \*